(12) United States Patent
De la Torre et al.

(10) Patent No.: US 9,659,210 B1
(45) Date of Patent: May 23, 2017

(54) SYSTEM AND METHOD FOR DETECTING AND TRACKING FACIAL FEATURES IN IMAGES

(71) Applicant: Carnegie Mellon University, Pittsburgh, PA (US)

(72) Inventors: Fernando De la Torre, Pittsburgh, PA (US); Xuehan Xiong, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 340 days.

(21) Appl. No.: 14/596,148

(22) Filed: Jan. 13, 2015

Related U.S. Application Data

(60) Provisional application No. 61/964,744, filed on Jan. 13, 2014, provisional application No. 62/122,064, filed on Oct. 9, 2014.

(51) Int. Cl.
*G06K 9/00* (2006.01)
*G06T 7/73* (2017.01)

(52) U.S. Cl.
CPC ..... *G06K 9/00241* (2013.01); *G06K 9/00268* (2013.01); *G06T 7/73* (2017.01); *G06T 2207/10004* (2013.01); *G06T 2207/20081* (2013.01)

(58) Field of Classification Search
CPC ......... G06T 7/246; G06T 7/248; G06T 7/251; G06T 7/33; G06T 7/337; G06T 7/344; G06T 7/73; G06T 7/74; G06T 7/75; G06T 2207/20004; G06T 2207/20012; G06T 2207/30201; G06K 9/00228; G06K 9/00241; G06K 9/00248; G06K 9/00268; G06K 9/00281; G06K 9/46; G06K 9/4671; G06K 9/468
See application file for complete search history.

(56) References Cited

U.S. PATENT DOCUMENTS

| | | | |
|---|---|---|---|
| 5,802,220 A * | 9/1998 | Black et al. | 382/276 |
| 2015/0169938 A1* | 6/2015 | Yao et al. | G06K 9/00228 382/103 |
| 2015/0186748 A1* | 7/2015 | Cootes et al. | G06K 9/621 382/159 |
| 2016/0191995 A1* | 6/2016 | el Kaliouby et al. | H04N 21/44218 725/12 |
| 2016/0196665 A1* | 7/2016 | Abreu et al. | G06T 7/2046 345/427 |

* cited by examiner

*Primary Examiner* — Andrew W Johns
(74) *Attorney, Agent, or Firm* — Dennis M. Carleton; Fox Rothschild LLP

(57) ABSTRACT

The present invention relates to a system for detecting and tracking facial features in images and can be used in conjunction with a camera. Given a camera, the system will detect facial landmarks in images. The present invention includes software for real time, accurate facial feature detection and tracking in unconstrained images and videos. The present invention is better, more robust and faster than existing approaches and can be implemented very efficiently allowing real-time processing, even on low-power devices, such as mobile phones.

6 Claims, 5 Drawing Sheets

(a)

(b)

(c)

(d)

SYSTEM AND METHOD FOR DETECTING AND TRACKING FACIAL FEATURES IN IMAGES

RELATED APPLICATIONS

This application claims the benefit of U.S. Provisional Applications 61/964,744, filed Jan. 13, 2014, and 62/122,064, filed Oct. 9, 2014, both of which are incorporated herein in their entirety.

GOVERNMENT RIGHTS

This invention was made with partial support of the government under the National Science Foundation Number IIS1116583. The government has certain rights in this invention.

FIELD OF THE INVENTION

This invention related to the field of facial feature detection and tracking in still and video images, and, in particular, presents a solution for facial feature detection and tracking using the supervised descent method for minimizing a non-linear least squares function.

BACKGROUND OF THE INVENTION

The problem addressed by the present invention is real-time, accurate facial feature detection and tracking in unconstrained images and videos. There are existing algorithms for detecting landmarks in images however; the prior art methods lack accuracy, robustness and can be too slow for real-time applications.

U.S. Pat. No. 8,121,347 ("System and Method for Detecting and Tracking Features in Images") proposes the formation of clustered shape subspaces corresponding to a set of images so that shape can changes nonlinearly due to perspective projection and complex 3D movements. Then a traditional landmark localization algorithm is used on each of the clusters. There are several drawbacks of the proposed method: (1) it uses a model, and cannot represent asymmetric expressions well; (2) the method is slow because it has to search for each landmark along the diagonal; (3) the method to create the model has to cluster the data and hence is prone to local minima; and (4) it is unclear that richer and more discriminative features can be added. Instead the proposed method uses richer features and proposes a new and better algorithm for landmark localization.

U.S. Pat. No. 8,103,058 ("Detecting and Tracking Objects in Digital Images"), presents a solution for detecting and tracking objects in digital images which includes selecting a neighborhood for each pixel under observation, the neighborhood being of known size and form, and reading pixel values of the neighborhood. However, the describe method does not work well for deformable objects, such as faces.

The problem of facial feature detection and tracking can be formulated as a non-linear least square problem. To solve non-linear least squares problems it is generally accepted that $2^{nd}$ order descent methods are the most robust, fast and reliable approach for nonlinear optimization of a general smooth function. However, in the context of facial feature detection and tracking, $2^{nd}$ order descent methods have two main drawbacks: (1) The function might not be analytically differentiable (e.g., when using histogram of gradients (HoG) features) and numerical approximations are impractical; and (2) The Hessian might be large and not positive definite.

It would therefore be desirable to provide a method of detecting and tracking facial features that addresses the identified deficiencies of the prior art methods.

SUMMARY OF THE INVENTION

The limitations and non-effectiveness of the prior art have been overcome by the present invention as described below. The present invention is used in conjunction with a digital camera or a pre-recorded video. Given an image containing one or more faces, the present invention will detect and track facial landmarks in each of the faces. This invention can be used in many applications, including, but not limited to, face editing, facial expression analysis, face recognition, gaze estimation, facial expression transferring and any application that has to do with facial image analysis.

The invention formulates the facial feature detection and tracking as a non-linear least squares (NLS) problem and describes the "Supervised Descent Method" (SDM), a method for minimizing the NLS function. During training, the SDM learns a sequence of descent directions that minimizes the mean of NLS functions. In use, SDM minimizes the NLS objective using the learned descent directions without computing the Jacobian or the Hessian (that are required for Newton's method).

This method has some important and useful properties. Firstly, it can be implemented very efficiently, allowing real-time processing, even on low-power devices, such as mobile phones. Secondly, most of the processing of the present invention involves matrix operations so it can be easily parallelized and/or vectorized taking advantage of modern multi-core CPUs/GPUs. Thirdly, the size of the model is compact (a few megabytes). Fourth, the method can recover from tracking failure and allows long-term tracking.

These and other features, objects, and advantages of the present invention will be readily apparent to persons of ordinary skill in the art.

DETAILED DESCRIPTION OF THE INVENTION

Figure 1:
FIG. 1 shows the output from the face detector, showing the bounding box in blue.

In the present disclosure, numerous specific details are provided, such as examples of the method and of how the software works, to provide a thorough understanding of embodiments of the invention. Persons of ordinary skill in the art will recognize, however, that the invention can be practiced without one or more of the specific details. In other instances, well-known details are not shown.

Supervised Descent Method (SDM)

The present invention describes the SDM in the context of face alignment.

Derivation of SDM

Given an image $d \in \Re^{m \times 1}$, of m pixels, $d(x) \in \Re^{p \times 1}$ indexes p landmarks in the image. h is non-linear feature extraction function (e.g., HoG) and $h(d(x)) \in \Re^{128p \times 1}$ in the case of extracting HoG features. During training, it is assumed that the correct p landmarks (in the preferred embodiment of the invention, 66 landmarks are used) are known, and they will be referred to as $x_*$ (see FIG. 5). Also, to reproduce the testing scenario, the face detector was run on the training images to provide an initial configuration of the landmarks ($x_0$), which corresponds to an average shape (see FIG. 2). In this setting, face alignment can be framed as minimizing the following function over $\Delta x$ $$f(x_0 + \Delta x) = \|h(d(x_0 + \Delta x)) - \phi_*\|_2^2, \tag{3}$$

where $\phi_* = h(d(x_*))$ represents the HoG values in the manually labeled landmarks. In the training images, $\phi_*$ and $\Delta x$ are known.

Eq. 3 has several fundamental differences with previous work, in Eq. 2. First, in Eq. 3 no model of shape or appearance is learned beforehand from training data. This invention aligns the image w.r.t a template $\phi_*$. For the shape, this model is a non-parametric one, and the landmark locations $x \in \Re^{2p \times 1}$ are optimized directly. Recall that in traditional PAMs, the non-rigid motion is modeled as a linear combination of shape basis learned by computing PCA on a training set. This non-parametric shape model is able to generalize better to untrained situations (e.g., asymmetric facial gestures). Although the method can be used with a previously learned model. Second, the present invention uses HoG features extracted from patches around the landmarks to achieve a robust representation against illumination. Observe that the HoG operator is not differentiable and minimizing Eq. 3 using first or second order methods requires numerical approximations (e.g., finite differences) of the Jacobian and the Hessian. However, numerical approximations will be very computationally expensive. The goal of this invention (SDM) is to learn a series of descent directions and re-scaling factors (done by the Hessian in the case of Newton's method) such that it produces a sequence of updates ($x_{k+1} = x_k + \Delta x_k$) starting from $x_0$ that converges to $x_*$ in the training data.

Now, only for derivation purposes, It is assumed that h is twice differentiable. Such assumption will be dropped at a later part of the section. Similar to Newton's method, a second order Taylor expansion is applied to Eq. 3 as, $$f(x_0 + \Delta x) \approx f(x_0) + J_f(x_0)^\top \Delta x + \frac{1}{2} \Delta x^\top H(x_0) \Delta x, \tag{4}$$

where $J_f(x_0)$ and $H(x_0)$ are the Jacobian and Hessian matrices of f evaluated at $x_0$. In the following, $x_0$ is omitted to simplify the notation. Differentiating (4) with respect to $\Delta x$ and setting it to zero gives us the first update for x, $$\Delta x_1 = -H^{-1} J_f = -2H^{-1} J_h^T (\phi_0 - \phi_*), \tag{5}$$

where the present invention made use of the chain rule to show that $$J_f = 2 J_h^T (\phi_0 - \phi_*), \text{ where } \phi_0 = h(d(x_0)).$$

The first Newton step can be seen as projecting $\Delta \phi_0 = -\phi_*$ onto the row vectors of matrix $R_0 = -2H^{-1} J_h^T$. In the rest of the description, the present invention will refer to $R_0$ as a descent direction. The computation of this descent direction requires the function h to be twice differentiable or expensive numerical approximations for the Jacobian and Hessian. The present invention will directly estimate $R_0$ from training data by learning a linear regression between $\Delta x_* = x_* - x_0$ and $\Delta \phi_0$. Therefore, this method is not limited to functions that are twice differentiable. However, note that during testing (i.e., inference) $\phi_*$ is unknown but fixed during the optimization process. To use the descent direction during testing, the invention will not use the information of $\phi_*$ for training. Instead, it rewrites Eq. 5 as a generic linear combination of feature vector $\phi_0$ plus a bias term $b_0$ that can be learned during training, $$\Delta x_1 = R_0 \phi_0 + b_0. \tag{6}$$

Using training examples, the SDM will learn $R_0$, $b_0$ used in the first step of optimization procedure.

It is unlikely that the algorithm can converge in a single update step unless f is quadratic under x. To deal with non-quadratic functions, the SDM will generate a sequence of descent directions. For a particular image, Newton's method generates a sequence of updates along the image-specific gradient directions, $$x_k = x_{k-1} - 2H^{-1} J_h^T (\phi_{k-1} - \phi_*). \tag{7}$$

$\phi_{k-1} = h(d(x_{k-1}))$ is the feature vector extracted at previous landmark locations $x_{k-1}$. In contrast, SDM will learn a sequence of generic descent directions $\{R_k\}$ and bias terms $\{b_k\}$, $$x_k = x_{k-1} + R_{k-1} \phi_{k-1} + b_{k-1}, \tag{8}$$

such that the succession of $x_k$ converges to $x_*$ for all images in the training set. Eq. (8) represents one possible update of the landmarks. In the following, we will develop the equations for the linear regression case, Eq. (8). Other more general regression/mappings from features to landmarks are possible and the modification of the algorithm is straight-forward. A more general update equation than Eq. (8) is:

i. $x_k = x_{k-1} + f(\phi_{k-1}) + b_{k-1}$,

Where $f(\phi_{k-1})$ is a generic mapping or regression from image features to landmarks.

Learning for SDM

Below, we describe how to learn $R_k$, $b_k$ from training data (the linear regression case), but using a more generic regression f( ) is straight-forward. Assume a set of face images $\{d^i\}$ and their corresponding hand-labeled landmarks $\{x_*^i\}$ is given. For each image starting from an initial estimate of the landmarks $x_0^i$, $R_0$ and $b_0$ are obtained by minimizing the expected loss between the predicted and the optimal landmark displacement under many possible initializations. The L2-loss is chosen for its simplicity and this solve for the $R_0$ and $b_0$ that minimizes $$\operatorname*{argmin}_{R_0, b_0} \sum_{d^i} \int p(x_0^i) \|\Delta x^i - R_0 \phi_0^i - b_0\|^2 dx_0^i, \tag{9}$$

where $\Delta x^i = x_*^i - x_0^i$ and $\phi_0^i = h(d^i(x_0^i))$. It is assumed that $x_0^i$ is sampled from a Normal distribution whose parameters capture the variance of a face detector. The integration is then approximated with Monte Carlo sampling, and instead minimize $$\operatorname*{argmin}_{R_0, b_0} \sum_{d^i} \sum_{x_0^i} \|\Delta x_*^i - R_0 \phi_0^i - b_0\|^2. \qquad (10)$$

Minimizing Eq. 10 is the well-known linear least squares problem, which can be solved in closed-form.

The subsequent $R_k$, $b_k$ can be learned as follows. At each step, a new dataset $\{x_*^i, \phi_k^i\}$ can be created by recursively applying the update rule in Eq. 8 with previously learned $R_{k-1}$, $b_{k-1}$. More explicitly, after $R_{k-1}$, $b_{k-1}$ is learned, the current landmarks estimate $x_k^i$ is updated using Eq. 8. A new set of training data is generated by computing the new optimal parameter update $\Delta x_*^{ki} = x_*^i - x_k^i$ and the new feature vector, $\phi_k^i = h(d^i(x_k^i))$. $R_k$ and $b_k$ can be learned from a new linear regressor in the new training set by minimizing:

$$\operatorname*{argmin}_{R_k, b_k} \sum_{d^i} \sum_{x_k^i} \|\Delta x_*^{ki} - R_k \phi_k^i - b_k\|^2. \qquad (11)$$

The error monotonically decreases as a function of the number of regressors that are added. In all experiments, in 4 or 5 steps the algorithm has converged.

It is important to note, that a more generic mapping/regression functions $f(\phi_{k-1})$ can easily be learned using standard methods that minimize:

$$\arg\min_{f(\cdot), b_0} \Sigma_{d^i} \Sigma_{x_0^i} \|\Delta x_*^i - f(\phi_0^i) - b_0\|^2$$

For the first iteration, and we could proceed as before for the remaining iterations. Recall that if $f_k(\phi_k) = R_k \phi_k$ we have the method explained in the previous paragraphs.

Algorithm for Facial Feature Detection

This embodiment of the invention describes more specifically the SDM method for facial feature detection in unconstrained images and videos. For instance, low resolution images, images with highly cluttered background. The embodiment assumes the existence of a database of training data, as described below.

Step 1—A face detector which returns a bounding box containing a face, as shown in FIG. 1, is used. The face image is cropped from the bounding box and then normalized into a fixed dimension rectangle, which, in the preferred embodiment, is a 200 by 200 pixel square, although any size could be used.

Figure 2:
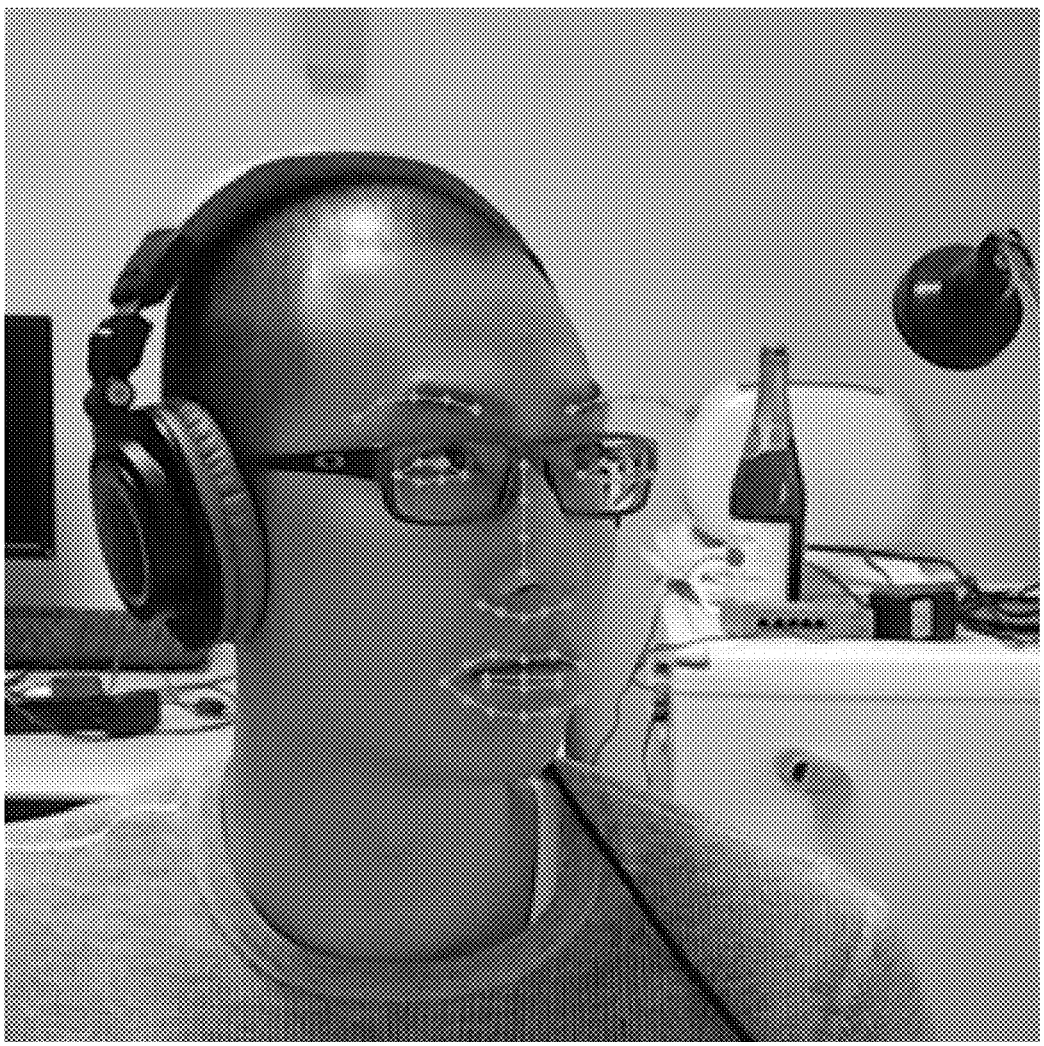
FIG. 2. Shows the application of an average face to provide the initial estimate of the location of the facial landmarks.

Step 2—The landmark locations $x_0$ are initialized by placing an average face in the center of the normalized bounding box given in Step 1. The average face is computed offline using a large face database. FIG. 2 shows the initialized facial landmarks of the average face as applied to the face in the normalized bounding box.

Step 3—This step involves regression from image features to displacement of landmarks. The image features are computed in a local patch around each predicted landmark using a histogram of gradients (HoG). The feature extraction step may take place at different resolutions (e.g., different levels of an image pyramid). The symbol $\phi_k$ is used to denote the image features extracted at the $k^{th}$ iteration. The displacement of landmarks is computed using a pre-learned function $f$ that takes the above image features as inputs:

$$x_k = x_{k-1} + f_k(\phi_k).$$

In the case of linear regression, $f_k(\phi_k) = R_k \phi_k$, but any regression or mapping method can be used. The displacement of landmarks can be represented directly by the (x, y) image coordinates or more compactly by a shape model, such as a principal component analysis (PCA) model.

To compute the HoG for each landmark, a square image patch surrounding the landmark is used. Preferably, the image patch will be 28×28 pixels. Calculating the HoG descriptor computation consists of the following steps. First, an image gradient is computed for the image patch. The image patch is then divided into 4×4 pixel spatial regions. For each pixel in the region a vote for an orientation histogram bin is calculated based on the orientation of the gradient element centered on it. Votes are accumulated into orientation bins over local spatial regions. The orientation bins are evenly spaced over 0°-180°, and in the preferred embodiment, are 22.5° wide. The vote is computed as the gradient magnitude. Lastly, in each spatial region, the accumulated histogram bins are normalized into unit vectors and all 4×4 unit vectors are concatenated into a column vector. Recall that many other features, other than HoG, could be used for the method.

Figure 3:
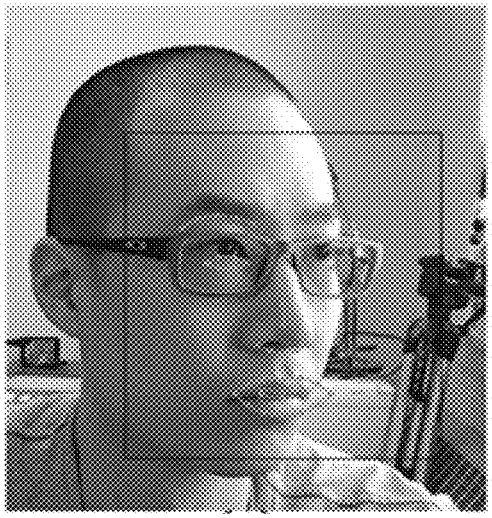
FIGS. 3 (a-d) show the predictions from the first 4 iterations of the proposed method. Dotted outlines indicate the predicted facial landmarks. a). step 0, the rectangle shows the face detector's output; b). step 1; c). step 2; d). step 3.
Figure 3:
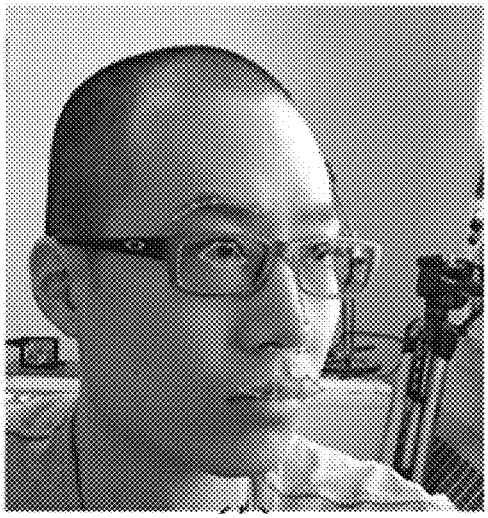
Figure 3:
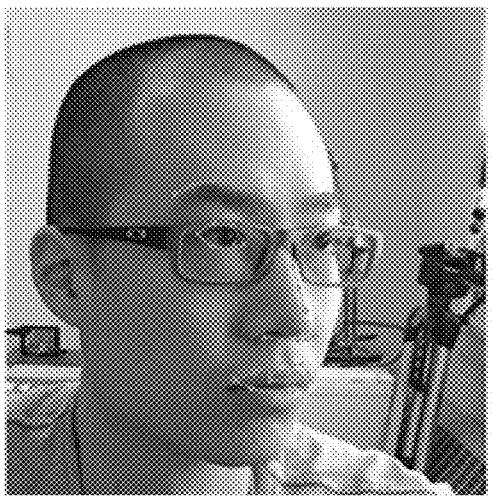
Figure 3:
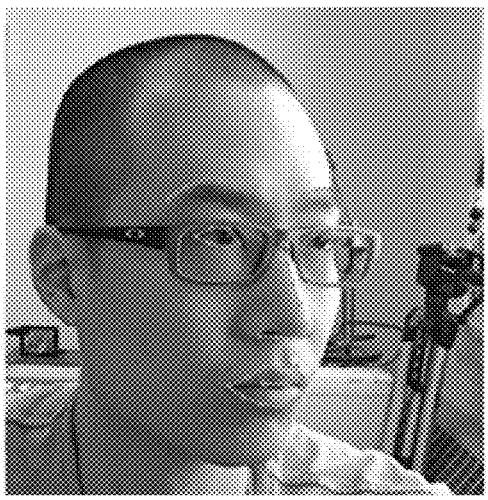

Step 4—This step involves iterating Steps 2 and 3. The number of iterations is defined in the training stage. The same number of iterations is used in testing. FIG. 3 shows the first four iterations of the present method.

Figure 4:
FIG. 4 shows three images with their prediction confidence scores attached.

Step 5—This step provides a calculation of a prediction score: A classifier is trained offline on landmarks well positioned and landmarks that do not correspond to facial features. The output of the classifier is used as the prediction score to evaluate quality of landmark prediction. FIG. 4 shows three examples of prediction scores. The score is between 0 and 1. Values of the confidence score closer to 1 indicate more confidence in the prediction. The score can be observed increasing as the landmark prediction becomes more accurate. This confidence score can be used to determine whether detection of landmarks is bad or the tracking is lost.

Algorithm for Facial Feature Tracking

The tracking of facial features is very similar to the detection of facial features described above. The main differences are that the tracking process happens from frame to frame in a video and the confidence score calculate in Step 5 below is used to determine if the face has been lost from frame to frame.

Step 1—The face image is normalized. From the prediction made in the previous frame, an estimate of scale and orientation of the face in the current frame is obtained. Using that information, the current frame is normalized to the same scale and orientation that were used in training.

Step 2—The landmark locations $x_0$ are initialized by placing an average face in the center of the normalized image given in step 1.

Step 3—This step involves regression from image features to displacement of landmarks. The image features are computed in a local patch around each predicted landmark using a histogram of gradients. The feature extraction step may take place at different resolutions (e.g., different levels of an image pyramid). The symbol $\phi_k$ is used to denote the image features extracted at the $k^{th}$ iteration. The displacement of landmarks is computed using a pre-learned function $f$ that takes the above image features as inputs:

$$x_k = x_{k-1} + f_k(\phi_k).$$

The landmark locations may be represented by (x, y) image coordinates or more compactly by a shape model, such as a PCA model.

Step 4—This step involves iterating Steps 2 and 3. The number of iterations is defined in the training stage. The same number of iterations is used in testing.

Step 5—This step involves calculation of a prediction score. A classifier is trained offline on faces and non-faces.

The output of the classifier is used as the prediction score to evaluate quality of landmark prediction. If the score is lower than a threshold, we determine that the tracker is lost (i.e., no face Can be found in the frame). FIG. 4 shows three examples of prediction scores. If it is determined that no face has been found in the frame, the face tracker is run again and Steps 1-5 are repeated.

Facial Feature Detection and Tracking During Training

Figure 5:
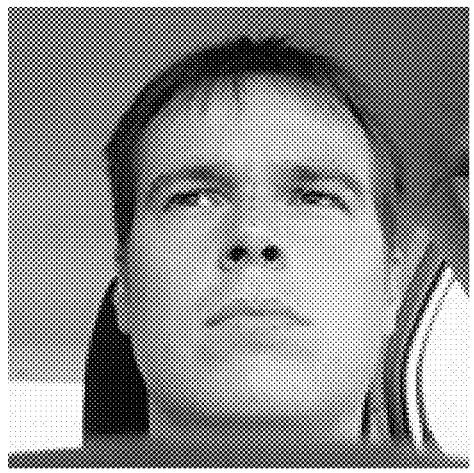
FIG. 5 illustrates the placement of facial landmarks of a few training samples.
Figure 5:
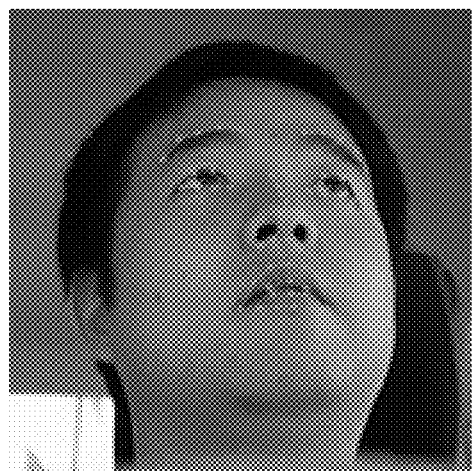
Figure 5:
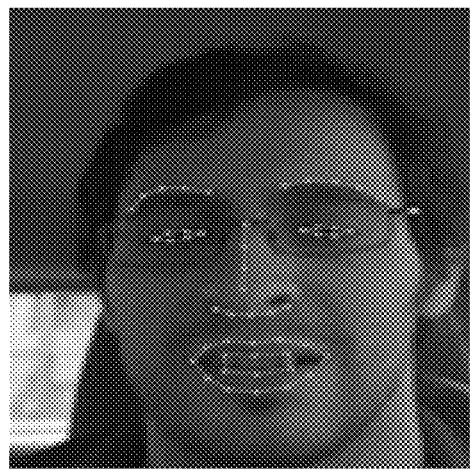

Step 1—This step involves the manual locating of facial landmarks in an image. In the preferred embodiment of the invention, 66 landmarks are manually placed to indicate the locations of facial features, although any number landmarks may be used. The training data consists of a set of face images having their corresponding landmarks $\{x_*^i\}$ labeled. Some examples of facial images having features marked with landmarks are shown in FIG. 5. As face images may be in different resolutions, all face images are normalized to a similar orientation and scale and then placed in the same coordinate system.

Step 2—This step involves the generation of initial landmark estimates.

For each normalized image, an average face is placed in the center of frame. Additional samples are added by perturbing the average face and those are used initial estimates of the landmarks $\{x_0^i\}$.

Step 3—The third step involves learning regression from image features to displacements of landmark. For each sample, the image features are computed in the local patch around each predicted landmark using, in the preferred embodiment, a histogram of gradients. The feature extraction step may take place at different resolutions (e.g., different levels of an image pyramid). The symbol $\phi_k^i$ is used to denote the image features extracted from the $i^{th}$ sample at the $k^{th}$ iteration. The displacement of landmarks $\Delta x_*^i$ is computed as the difference between the current landmark prediction and the labeled landmarks.

$$\Delta x_*^i = x_k^i - x_*^i$$

The landmark locations may be represented by (x, y) image coordinates or more compactly by a shape model, such as a PCA model. A function $f$ (regressor) is learned as a mapping between the two by minimizing the following loss:

$$\min_f \sum_i \|f(\phi_k^i) - \Delta x_*^i\|^2$$

Step 4—In this step, the landmarks are updated. For each sample, landmarks are updated using the following equation, where $f$ is the learned function from step 3, $$x_k^i = x_{k-1}^i + f(\phi_k^i).$$

Step 5—This step involves iterating Steps 3 and 4 until convergence is achieved. The method is said to be converged in training if the predicted landmark locations are sufficiently close to the true landmarks.

While specific embodiments of the present invention have been provided, it is to be understood that these embodiments are for illustration purposes and are not limiting. Many additional embodiments will be apparent to persons of ordinary skill in the art. It should also be noted that the method could be applied to shapes other than faces, given an appropriate set of training images for the desired shape.

We claim:

1. A system for detecting and tracking features in a series of images of an object, comprising:
   a camera;
   a microprocessor, in communication with said camera, said microprocessor running software for performing, for each image, the functions of:
   (a) detecting the presence of said object in said image and placing said object in a bounding box;
   (b) applying an average model consisting of a plurality of landmarks to the center of said bounding box;
   (c) using multiple applications of a regression function to update said landmarks by mapping features of said object to said landmarks.

2. The system of claim 1 wherein said software further performs the functions of;
   (d) applying a classifier to determine how closely said features map to said landmarks in said object;
   (e) repeating steps (b)-(d) for the next image in said series of images if said classifier determines that the mapping of features to landmarks exceeds a predetermined, and
   (f) repeating steps (a)-(d) for the next image in said series of images if said classifier determines that the mapping of features to landmarks does not exceed a predetermined threshold.

3. The system of claim 2 wherein said object is a face.

4. The system of claim 2 wherein said features of said object are expressed as a vector of histograms of gradients.

5. The system of claim 2 wherein said regression functions are based on a set of training data.

6. The system of claim 5 wherein said training data consisting of a plurality of images having landmarks manually applied thereto.

* * * * *